March 12, 1940.  R. C. FRUSH  2,193,276
WEED REMOVING ATTACHMENT FOR LAWN MOWERS
Filed Aug. 31, 1938
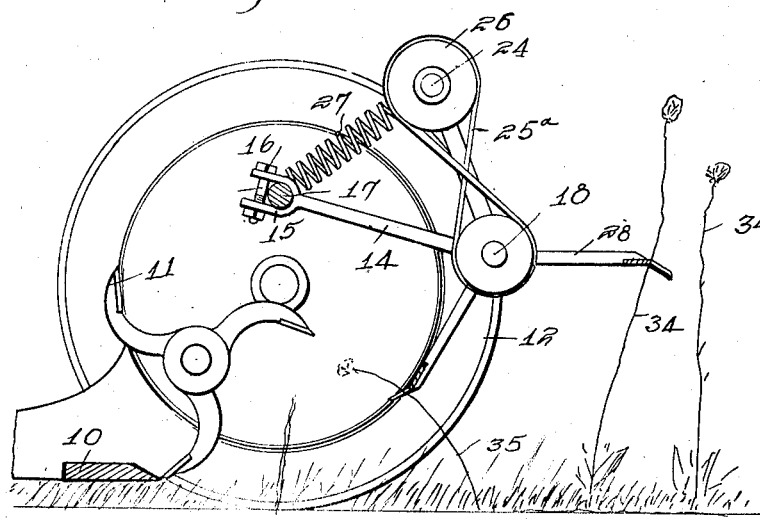
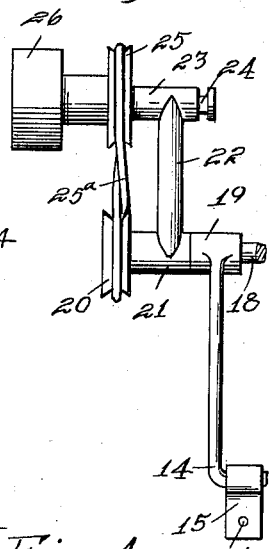
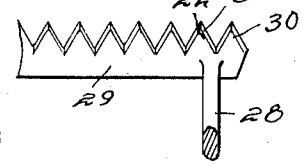
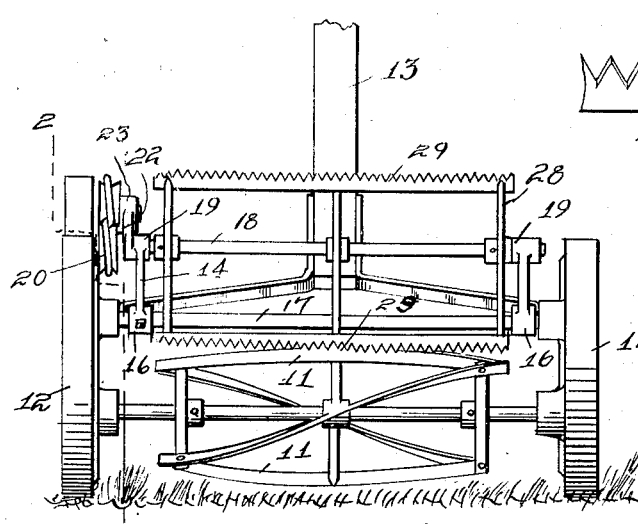
Inventor.
Roy C. Frush.

Patented Mar. 12, 1940

2,193,276

UNITED STATES PATENT OFFICE 2,193,276

WEED REMOVING ATTACHMENT FOR LAWN MOWERS

Roy C. Frush, Adel, Iowa

Application August 31, 1938, Serial No. 227,715

1 Claim. (Cl. 56—238)

It is well known that the lawn mowers now in common use are very efficient in cutting grass of a certain length, and it is also well known that if the grass or weeds exceed that certain length these lawn mowers are not efficient and will bend the long grass or weeds forwardly and pass over them without cutting them. With the most carefully kept lawns it is the common experience that weeds such as dandelions grow to an excessive height much more rapidly than lawn grass and, hence, between cuttings on said lawn such grasses or weeds as have grown beyond a certain height are not cut and soon resume upright positions and develop their seeds and scatter them over the lawn.

The object of my invention is to provide a weed removing attachment to be detachably connected to a lawn mower and operated by power from the lawn mower and which will remove from the lawn all of such tall grasses or weeds, in some instances by cutting off the long stems thereof, in other instances shredding such long stems as cannot be cut, in other instances pulling the head or bloom from them, or when the tall grasses or weeds are not removed by any of said methods, forcing them to positions where they will readily enter the cutting mechanism of the lawn mower and be thereby cut off.

A further object is to provide an attachment of this class of simple, durable and inexpensive construction and of light weight and which may be readily, quickly and easily attached to and removed from a lawn mower and which is operated by power from the lawn mower at a speed greatly in excess of that at which the rotary cutter element of the ordinary lawn mower is operated, which high speed, together with the novel structure of the blades, will effectively remove tall grasses and weeds by one or the other of the methods before mentioned.

In the accompanying drawing

Figure 1 shows the front elevation of a lawn mower having my improved weed removing attachment applied thereto;

Figure 2 shows a vertical sectional view on the line 2—2 of Figure 1;

Figure 3 shows an enlarged detail plan view illustrating the means for driving the shaft of the attachment from the traction wheel of a lawn mower;

Figure 4 shows an enlarged detail plan view of one of the weed removing blades and illustrating the sharp-pointed teeth with beveled edges and V-shaped notches between them; and Figure 5 shows a similar view of another one of the blades having longitudinal sharpened edges between the teeth.

My improved attachment is adapted to be applied to lawn mowers of the ordinary type now in general use, and these lawn mowers comprise a frame having a stationary cutting blade 10 and a series of rotary cutting blades 11 to co-operate with the stationary blade 10, and they also have two traction wheels 12 and a handle 13.

My improved attachment comprises a frame 14 having at each end a clamping member 15 provided with a bolt 16 by which it may be clamped to a transverse rod 17 of the lawn mower frame. Mounted in the end of the frame 14 opposite from the clamps 15 is a horizontally arranged shaft 18 rotatably supported in the bearing 19, and on this shaft 18 is a grooved pulley 20. Rotatably mounted on the shaft 18 is a sleeve 21 to which is fixed an arm 22, and on the other end of the arm 22 is a sleeve 23 in which is rotatably mounted a shaft 24, and on this shaft is a grooved pulley 25 and a friction roller 26. A spring 27 is applied to the sleeve 24 at one end, and its other end is detachably connected to the frame member 17 of a lawn mower for yieldingly holding the friction drive wheel 26 in contact with one of the tractor drive wheels of the lawn mower. A belt 25a connects said pulleys.

Fixed to the shaft 18 are three sets of radially extended arms 28 equally spaced apart, and these arms support the weed removing blades. These blades are indicated generally by the reference numeral 29, and two of them are alike and have the construction illustrated in Figure 4. Projecting from the outer edge of the blade is a series of teeth 30 with V-shaped notches between them. The side edges of these teeth are beveled at 31 to form sharp cutting edges, and the points 32 are sharp pointed due to the beveling of the side edges of the teeth. One of the blades of the series, as shown in Figure 5, has the same sort of teeth 30 as the blades shown in Figure 4, and in addition thereto these teeth are widely spaced apart, and between them the outer edge of the blade is beveled and sharpened at 33. All of the blades, as shown in Figure 2, are inclined in such manner that when the blade is at the forward limit of its movement, as shown at the right in Figure 2, and the arm 28 is substantially horizontal, the outer edges of the blades are inclined downwardly and forwardly.

In practical operation it is obvious that my improved attachment may be readily, quickly and easily applied to any ordinary lawn mower by simply applying the clamps 15 to the lawn mower member 17 and then connecting the spring 27 to the member 17, as shown in Figure 2. When this has been done and when the lawn mower is advanced in the ordinary way, the blades 29 will be rotated rapidly in the direction with the blade at the front moving downwardly and rearwardly. Due to the fact that the friction or drive wheel 26 is much smaller in diameter than the traction wheels of the motor, these blades will be rotated at a relatively high rate of speed as compared with that of the lawn motor rotary blades, and the blades 29 rotate in a path of travel a substantial distance above the stationary cutter blade 10 of the lawn mower, and they also, when at their upper limit of movement, are spaced a considerable distance above the blades of the lawn mower when they are at their upper limit of movement.

Assuming that the cutter bar of the lawn mower is so adjusted that it will cut off the lawn grass to about the length of two inches and that the normal uncut lawn grass is about five inches in length, then the lawn mower will effectively cut the lawn grass. However, it frequently occurs that when the lawn is in condition to be cut there are numerous weeds and grasses which extend to a considerable distance above the normal level of the lawn grass, say, for instance, ten or twelve inches. It is well known that under such circumstances the ordinary lawn mower will, when it engages said tall weeds and grasses, bend them forwardly so that the lawn mower will pass over them without cutting them, and that these tall weeds and grasses will, therefore, soon again assume an upright position, and these tall uncut weeds and grasses will bloom and deposit their seeds upon the lawn.

For the purpose of illustration we will assume that there are in the lawn numerous tall stems of dandelion, such, for instance, as illustrated at 34 in Figure 2. With my attachment these long dandelion stems will be engaged by the sharper points 32, and since these sharp points are being rotated rapidly they will, in some instances, cut off the long stems at the instant when they first impact them. If the stems are not thus cut off, then, due to the high speed of the blades, these stems will be impacted by several successive blades, and if the stems are too tough to be cut off, they will be torn and shredded by the sharp points enough to injure the stems to such an extent that the blooms will not develop seeds. For this purpose it is obvious that these points must be sharp like a needle and not simply teeth formed by cutting V-shaped notches in a blade without further beveling them to form sharp cutting edges and needle-like points.

If the stems on the dandelions are relatively short, as shown at 35 in Figure 2, then the stems will be drawn into the V-shaped notches of the blades, and the head or bloom on the upper end of the stem will be torn off, and in the further event that none of the results just described take place and the stems or grasses are too tough to be thus cut or shredded, the V-shaped notches will engage them and incline them rearwardly, as shown at 36 in Figure 2, and force them into such contact with the rotary cutter blade of the lawn mower that they will be drawn between the rotary and stationary blades of the lawn mower and be severed thereby in the ordinary manner.

In practice I have found that in some instances the straight sharp edges 33 will, with certain weeds or grasses, effectively cut them off without tearing or shredding them.

The attachment is of very simple and inexpensive construction and light weight, and the amount of power required to operate it is so small that the operator pushing the lawn mower by hand in the ordinary way is scarcely able to appreciate the additional power required to operate my attachment, and in practice I have found that substantially all of the grasses and weeds which appreciably extend above the normal level of the lawn grass are removed by my attachment during the ordinary operation of the lawn mower.

I claim as my invention:

The combination with a lawn mower of the class having a horizontally arranged sharpened cutter blade and a series of rotatable sharpened blades to co-operate with the stationary blade, of a device for removing excessively tall vegetation, comprising a frame, means for attaching it to a lawn mower, a rotatable shaft carried by the frame, a series of radial arms fixed to the shaft, blades fixed to the arms, said blades being substantially straight and parallel with the stationary blade of the lawn mower and when at their forward limit of movement being inclined downwardly and forwardly, one or more of said blades having sharpened points with V-shaped notches between them, the sides of the V-shaped notches being sharpened, and one or more of said blades having sharpened projections spaced apart, the portions of the blade between the projections being substantially straight and parallel with the stationary lawn mower blade, the position of said device relative to the lawn mower being such as to engage tall vegetation and force it rearwardly and downwardly and hold it into the path of travel of the rotary lawn mower blades, and means for rotating said shaft by power from one of the lawn mower wheels.

ROY C. FRUSH.